Aug. 28, 1923. 1,466,567
R. W. SMITH
REFLECTOR FOR AUTOS
Filed Sept. 3, 1920
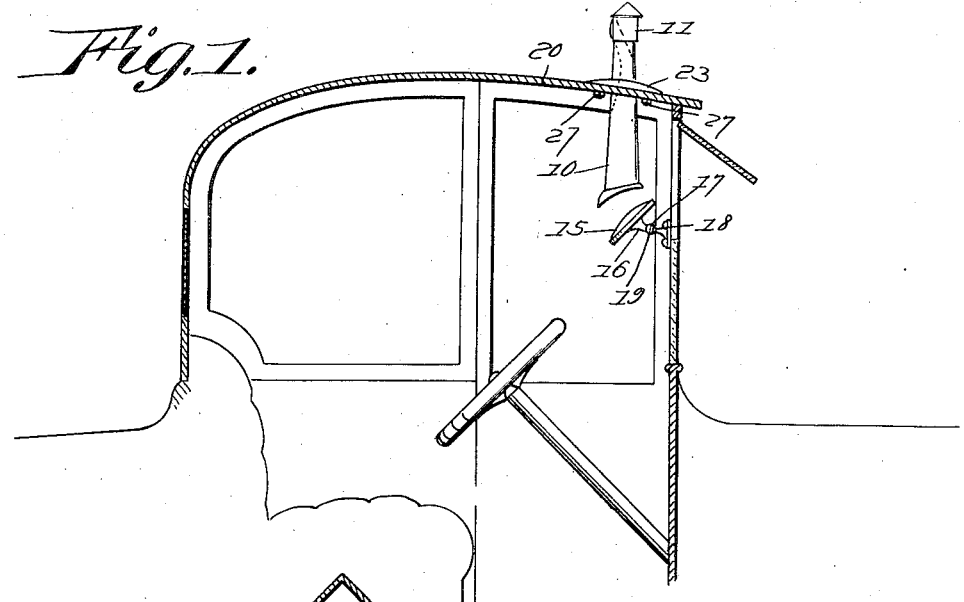
Fig. 1.
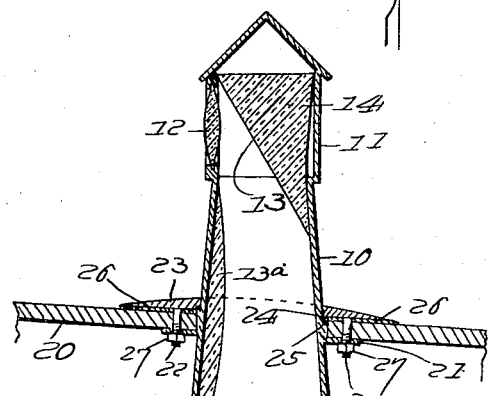
Fig. 2.
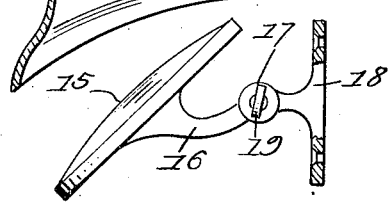
Inventor
Raymond W. Smith Patented Aug. 28, 1923.

1,466,567

UNITED STATES PATENT OFFICE.

RAYMOND W. SMITH, OF DETROIT, MICHIGAN.

REFLECTOR FOR AUTOS.

Application filed September 3, 1920. Serial No. 407,982.

*To all whom it may concern:*

Be it known that I, RAYMOND W. SMITH, a citizen of the United States, residing at Detroit, in the county of Wayne and State of Michigan, have invented new and useful Improvements in Reflectors for Autos, of which the following is a specification.

The object of the invention is to provide means for giving a view of the road in rear of an automobile to the driver of the machine without necessitating the turning of the head or looking through the rear windows, so as to determine to what extent the forward speed may be reduced without risk of a rear end collision, or whether or not a turn to the right or left may be made in safety, and with these objects in view, the invention consists of the construction and combination of parts, of which a preferred embodiment is shown in the accompanying drawings wherein:—

Figure 1, is a side view of the portion of the vehicle equipped with an apparatus embodying the invention.

Figure 2, is a vertical sectional view of the apparatus enlarged to show the means, whereby the elements thereof are mounted upon the vehicle.

The apparatus embodies essentially a tube 10 provided at its upper end with a cap 11 provided with a rear light or lens 12 in front of which is arranged an inclined reflecting medium 13 which may be formed on the side of a prism 14. Beneath the lower end of said tube is arranged a mirror 15 having a supporting arm 16 which is pivotally mounted as at 17 upon a suitable bracket 18 fitted with a clamping screw 19 so that the mirror may be adjusted at different angles to suit the line of vision of the driver to catch the reflection from the mirror which is projected downward through the tube to an intermediately disposed convexed mirror 13ª and thence to the mirror 15. Obviously the device operates on the general principle of a periscope with the cap arranged sufficiently above the top of the vehicle as indicated at 20 to afford a clear vision in rear of the machine and the mounting of the tube in the top of the vehicle may be effected by providing the former with a horizontal collar 21 engaged by bolts 22 depending from a bearing plate 23 which is arranged upon the exterior surface of the top casing in interlocking communication as indicated at 24 with a shoulder 25 of the tube, a rubber or similar washer 26 being introduced between the plate and the upper surface of the vehicle top. The collar 21 is arranged adjacent to the inner or near surface of the vehicle top and the bolts extending therefrom are fitted with nuts 27 to lock the members in their operative relations. The washer 26 serves to prevent leakage of water through the joint between the sides of the tube and top of the vehicle.

The invention having been described, what is claimed as new and useful is:—

A reflector for automobiles having a sight tube provided with a lateral flange for fastening to the under surface of a vehicle top and provided above the plane of the flange with a shoulder, an annular plate for arrangement in contact with the exterior surface of the vehicle top and having interlocking engagement with said shoulder of the sight tube, bolts connecting the said plate with the flange, a washer interposed between the annular plate and the surface of the vehicle top, and a mirror adjustably mounted in the path of rays of light projected longitudinally through the sight tube.

In testimony whereof he affixes his signature.

RAYMOND W. SMITH.

Witness:
ETTA GOLDSTEIN.